US011922975B2

(12) United States Patent
Wu et al.

(10) Patent No.: US 11,922,975 B2
(45) Date of Patent: Mar. 5, 2024

(54) METHOD, APPARATUS, DEVICE AND MEDIUM FOR GENERATING VIDEO IN TEXT MODE

(71) Applicant: Beijing Zitiao Network Technology Co., Ltd., Beijing (CN)

(72) Inventors: Yiying Wu, Beijing (CN); Hui Sun, Beijing (CN); Daoyu Wang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/087,566

(22) Filed: Dec. 22, 2022

(65) Prior Publication Data

US 2023/0130806 A1 Apr. 27, 2023

Related U.S. Application Data

(63) Continuation of application No. PCT/CN2021/119438, filed on Sep. 18, 2021.

(30) Foreign Application Priority Data

Sep. 25, 2020 (CN) .......................... 202011027603.2

(51) Int. Cl.
*G11B 27/036* (2006.01)
*G06F 3/0482* (2013.01)
(Continued)

(52) U.S. Cl.
CPC .......... *G11B 27/036* (2013.01); *G06F 3/0482* (2013.01); *G06F 3/04845* (2013.01); *G06F 3/0488* (2013.01); *G06F 3/165* (2013.01)

(58) Field of Classification Search
CPC . G11B 27/036; G06F 3/0482; G06F 3/04845; G06F 3/0488; G06F 3/165
See application file for complete search history.

(56) References Cited

U.S. PATENT DOCUMENTS 8,701,020 B1\* 4/2014 Fulcher .............. H04N 21/4788
715/756
11,645,804 B2 5/2023 Huang et al.
(Continued)

FOREIGN PATENT DOCUMENTS

| CN | 109120866 A | 1/2019 |
| CN | 109215655 A | 1/2019 |

(Continued)

OTHER PUBLICATIONS

"How is the text video with scrolling subtitles on Douyin made?" Coozhi.com, Available Online at http://www.coozhi.com/youxishuma/shouji/123723.html, Dec. 9, 2019, 6 pages.
(Continued)

*Primary Examiner* — Thai Q Tran
*Assistant Examiner* — Jose M Mesa
(74) *Attorney, Agent, or Firm* — Alleman Hall & Tuttle LLP

(57) ABSTRACT

In the present disclosure, methods, apparatuses, devices and media are provided for generating a video in a text mode in an information sharing application. In a method, a request is received for generating the video from a user of the information sharing application. An initial page is displayed for generating the video in the information sharing application, the initial page comprising an indication for entering text. Text input is obtained from the user in response to detection of a touch by the user in an area where the initial page locates. A video to be published in the application is generated based on the text input. In some examples, within the information sharing application, the user may directly gen-
(Continued)

erate a corresponding video based on a text input. In this way, a complexity of user operation may be reduced, and the user may be provided with richer publishing content.

15 Claims, 9 Drawing Sheets

(51) Int. Cl.
*G06F 3/04845* (2022.01)
*G06F 3/0488* (2022.01)
*G06F 3/16* (2006.01)

(56) References Cited

U.S. PATENT DOCUMENTS

| | | | |
|---|---|---|---|
| 2012/0033948 A1* | 2/2012 | Rodriguez | G11B 27/034 386/282 |
| 2016/0173960 A1* | 6/2016 | Snibbe | H04N 21/2353 386/285 |
| 2016/0234494 A1 | 8/2016 | Seregin et al. | |
| 2017/0195676 A1 | 7/2017 | Chuang et al. | |
| 2017/0364599 A1* | 12/2017 | Ohanyerenwa | G06F 16/48 |
| 2020/0050288 A1 | 2/2020 | Williams et al. | |
| 2020/0211244 A1* | 7/2020 | Nicolson | G06V 20/46 |
| 2020/0272309 A1* | 8/2020 | Xiao | H04N 21/431 |

FOREIGN PATENT DOCUMENTS

| | | |
|---|---|---|
| CN | 110134920 A | 8/2019 |
| CN | 112153475 A | 12/2020 |
| JP | 2020053026 A | 4/2020 |
| KR | 20180125237 A | 11/2018 |
| KR | 20180129265 A | 12/2018 |
| WO | 2020150693 A1 | 7/2020 |

OTHER PUBLICATIONS

"Zishuo how to input text and directly generate a rotating video read by a real person," Baidu.com, Available Online at https://jingyan.baidu.com/article/b87fe19ec678271218356881.html, Jul. 2, 2019, 2 pages.
"It's that simple! 3 seconds to generate Douyin explosive text video," Sohu.com, Available Online at https://www.sohu.com/a/244381326_100067544, Jul. 31, 2018, 2 pages.
"Teach you to make a text-only video of TikTok in 1 minute," Colorful Information, Published in Young Infatuation, Aug. 11, 2020, 10 pages.
Korean Intellectual Property Office, Office Action Issued in Application No. 10-2023-7002186, dated May 23, 2023, Korea, 6 Pages.
"How to add text to WeChat video accounts," Baidu Experience, Available Online at jingyan.baidu.com/article/ab69b270e1d26c6da7189f85.html, Mar. 4, 2020, 6 pages.
Intellectual Property India, Office Action Issued in Application No. 202327004094, dated Aug. 2, 2023, 6 pages.
Japan Patent Office, Office Action Issued in Application No. 2023506273, dated Aug. 22, 2023, 6 pages.
European Patent Office, Extended European Search Report Issued in Application No. 21871463.2, dated Oct. 30, 2023, Germany, 8 pages.
Wancai Information, "Teach you to make a text-only video of Douyin in 1 minute," Zhihu, Available Online at zhuanlan.zhihu.com/p/180383015, Aug. 11, 2020, 10 pages.

* cited by examiner

METHOD, APPARATUS, DEVICE AND MEDIUM FOR GENERATING VIDEO IN TEXT MODE

CROSS-REFERENCE TO RELATED APPLICATIONS

The present application is a continuation of International Application No. PCT/CN2021/119438, filed on Sep. 18, 2021, which claims priority to Chinese patent application No. 202011027603.2, filed on Sep. 25, 2020, both of which are hereby incorporated by reference in their entireties.

FIELD

Implementations of the present disclosure relate to the computer field, in particular to methods, apparatus, devices and computer storage media for generating a video in a text mode.

BACKGROUND

With developments of information technology, a variety of information sharing applications have been provided. A user may edit a text, take a photo or a video, and publish them in the information sharing application. Since the video may comprise information such as the voice, image, text and other aspects, video information has become a popular information type that most users are willing to accept. At present, video edit applications that support inserting texts into videos have been developed. However, when the user wants to publish text mode videos in the information sharing application, they have to first generate and store videos in a video edit application, and then upload the video into the information sharing application. At this point, how to generate the text mode video in a more convenient and effective way has become a research hotspot.

SUMMARY

In a first aspect of the present disclosure, there is provided a method for generating a video in a text mode in an information sharing application. In the method, a request is received for generating the video from a user of the information sharing application. An initial page is displayed for generating the video in the information sharing application, the initial page comprising an indication for entering a text. A text input is obtained from the user in response to a detection of a touch by the user in an area where the initial page locates. A video to be published in the information sharing application is generated based on the text input.

In a second aspect of the present disclosure, there is provided an apparatus for generating a video in a text mode in an information sharing application. The apparatus comprises: a receiving module, being configured for receiving a request for generating the video from a user of the information sharing application; a displaying module, being configured for displaying an initial page for generating the video in the information sharing application, the initial page comprising an indication for entering a text; an obtaining module, being configured for obtaining a text input from the user in response to a detection of a touch of the user in an area where the initial page locates; and a generating module, being configured for generating based on the text input the video to be published in the information sharing application.

In a third aspect of the present disclosure, there is provided an electronic device. The electronic device comprises: a memory and a processor; wherein the memory is used to store one or more computer instructions, wherein the one or more computer instructions are executed by the processor to implement a method according to the first aspect of the present disclosure.

In a fourth aspect of the present disclosure, there is provided a computer-readable storage medium storing one or more computer instructions thereon, wherein the one or more computer instructions are executed by the processor to implement a method according to the first aspect of the present disclosure.

With the example implementations according to the present disclosure, the user may directly generate corresponding videos based on text inputs within the information sharing application. In this way, a complexity of user operation may be reduced, and the user may be provided with richer publishing content.

BRIEF DESCRIPTION OF THE DRAWINGS

The above and other features, advantages and aspects of the implementations of the present disclosure will become more apparent in combination with the accompanying drawings and with reference to the following detailed description. In the drawings, the same or similar drawings indicate the same or similar elements, where.

DETAILED DESCRIPTION OF IMPLEMENTATIONS

Implementations of the present disclosure will be described in more detail below with reference to the accompanying drawings. Although some implementations of the present disclosure are shown in the accompanying drawings, it should be understood that the present disclosure may be implemented in various ways and should not be interpreted as limitations to the implementations described here. Instead, these implementations are provided to understand the present disclosure in a full and complete way. It should be understood that the drawings and specification of the present disclosure are only for illustrative purposes and are not intended to limit the protection scope of the present disclosure.

In the description of the implementation of the present disclosure, the term "comprises" and its variants are to be considered as open terms that mean "comprises, but is not limited to." The term "based on" is to be considered as "based at least in part on." The terms "an implementation" and "one implementation" are to be read as "at least one implementation." The term "first," "second," and the like may refer to different objects or the same object. Other definitions, either explicit or implicit, may be comprised below.

Figure 1:
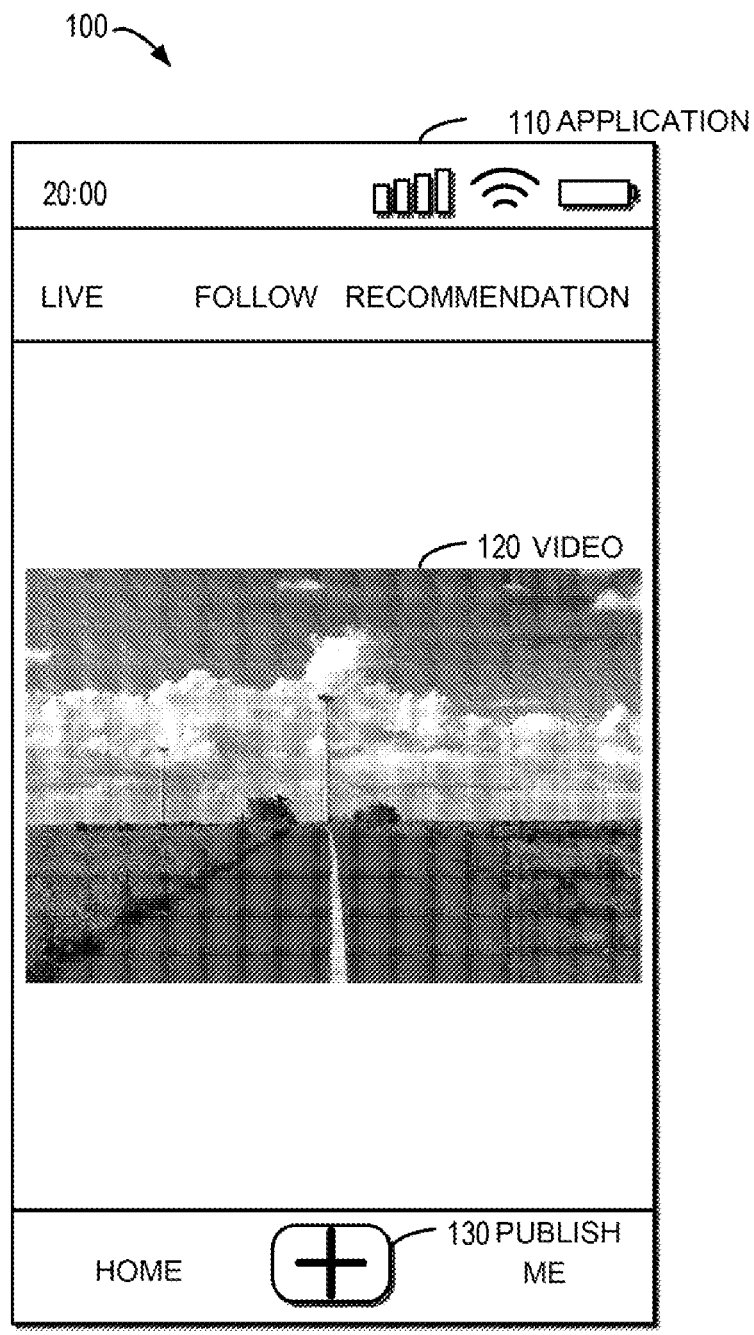
FIG. 1 schematically shows a block diagram of an application environment according to an example implementation of the present disclosure.

At present, it is provided a variety of information sharing applications (referred to as applications for short). Since the video may comprise various information, most users are more willing to accept media information in the video type. For the convenience of description, first referring to FIG. 1 to overview an application environment according to an example implementation of the present disclosure. Specifically, FIG. 1 schematically shows a block diagram of an application environment 100 according to an example implementation of the present disclosure. In FIG. 1, a user may watch and/or publish a video via the application 110. For example, the application 110 may push a video 120 to the user, and the user may watch favorite videos through searching, sliding, page turning and other operations. In addition, the user may press a "publish" button 130 to publish the video.

There have been developed a variety of video publishing modes. For example, the user may publish the video by photo shooting, segment shooting, quick shooting, uploading the video from albums, and the like. Each user may choose his/her preferred way to publish the video. Some users may want to publish videos that are generated based on texts. For example, the user expects to input greetings such as "Happy Mid-Autumn Festival," "Happy Birthday," and the like, to generate corresponding videos that are to be published.

At present, there are developed video edit applications that support inserting texts into videos. However, the user of the application 110 has to first generate and store the video in the video edit application, and then upload the video in the application 110 for publishing. The above-mentioned operations involve a plurality of applications, resulting in complicated user operations and implementation difficulties at terminal devices with small screen areas such as mobile phones. At this time, how to generate videos in the text mode for the user of the information sharing applications in a more convenient and effective way has become a research focus.

In order to at least partially solve the above and/or other drawbacks in the art, a method is proposed for generating a video in a text mode in an information sharing application according to an example implementation of the present disclosure. In this method, a request for generating a video may be received from a user of the information sharing application, and then a method for generating the video in the text mode may be started. Hereinafter, a brief of an example implementation according to the present disclosure will be described with reference to FIG. 2, here FIG. 2 schematically shows a block diagram of a user interface 200 for generating a video in a text mode according to an example implementation of the present disclosure.

Figure 2:
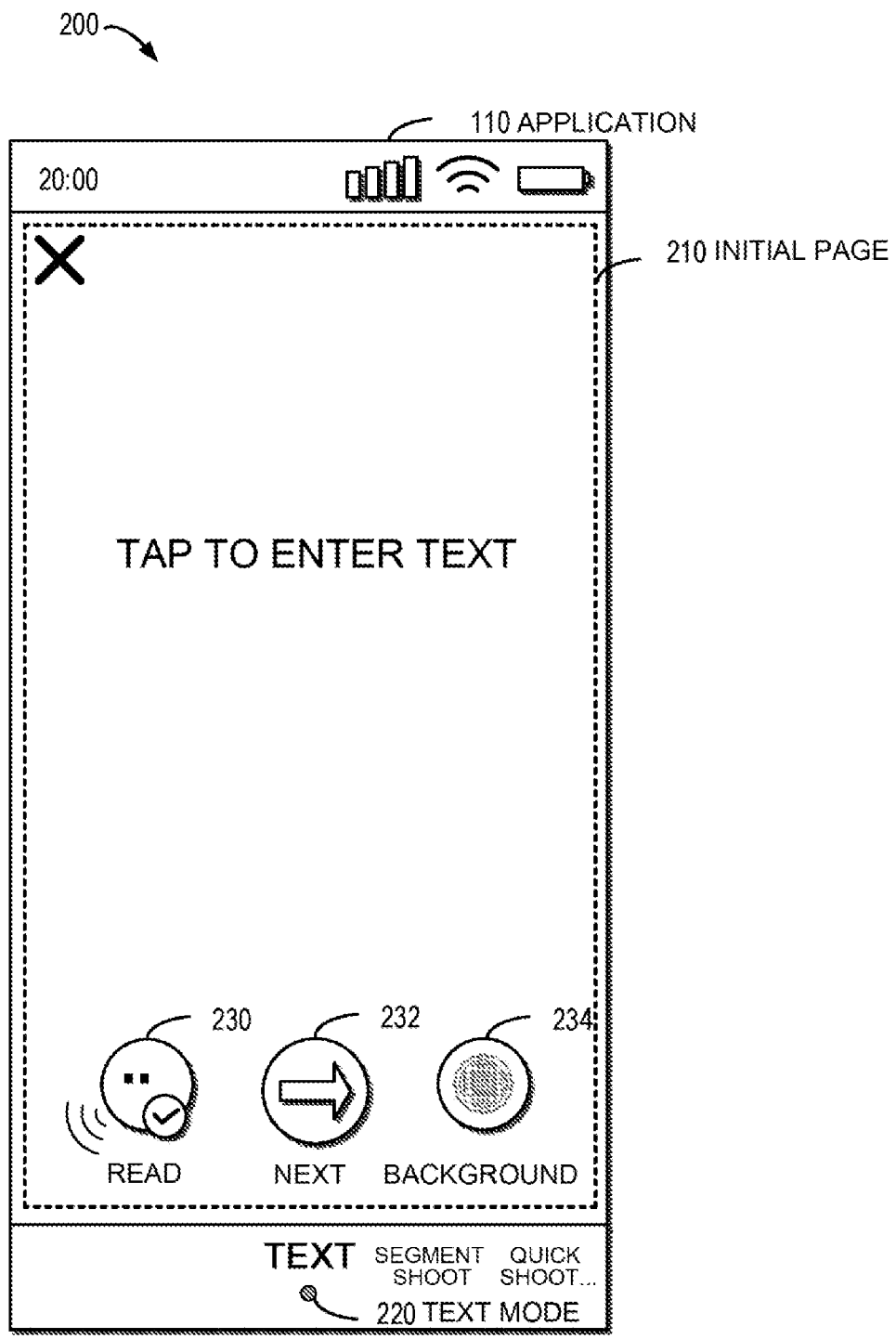
FIG. 2 schematically shows a block diagram of a user interface for generating a video in a text mode according to an example implementation of the present disclosure.

After the user presses the publish button 130 in FIG. 1, the user interface 200 shown in FIG. 2 may be accessed. The user may select the text mode 220 in the menu at the bottom of the user interface 200, so as to start the generating method according to the example implementation of the present disclosure. At this time, an initial page 210 for generating the video may be displayed in the application 110. The initial page 210 may comprise an indication for entering the text: "Touch to enter text." The user may input a corresponding text in the initial page 210. For example, the user may perform a touch operation in the area where the initial page 210 locates so as to start the process for inputting text.

The application 110 then obtains the text input from the user and generates a video comprising the text input for publication. It will be understood that the page layout shown in FIG. 2 is only schematic. According to the example implementation of the present disclosure, other page layouts may be used, as long as the method according to the example implementation of the present disclosure may be implemented.

By using the example implementation of the present disclosure, the user may directly generate the corresponding video based on text input within the information sharing application without a need to call the video edit application additionally. In this way, the complexity of the user operation may be reduced, errors that may occur during a switch between the multiple applications by the user may be avoided, and richer publication contents may be provided to the user.

Figure 3:
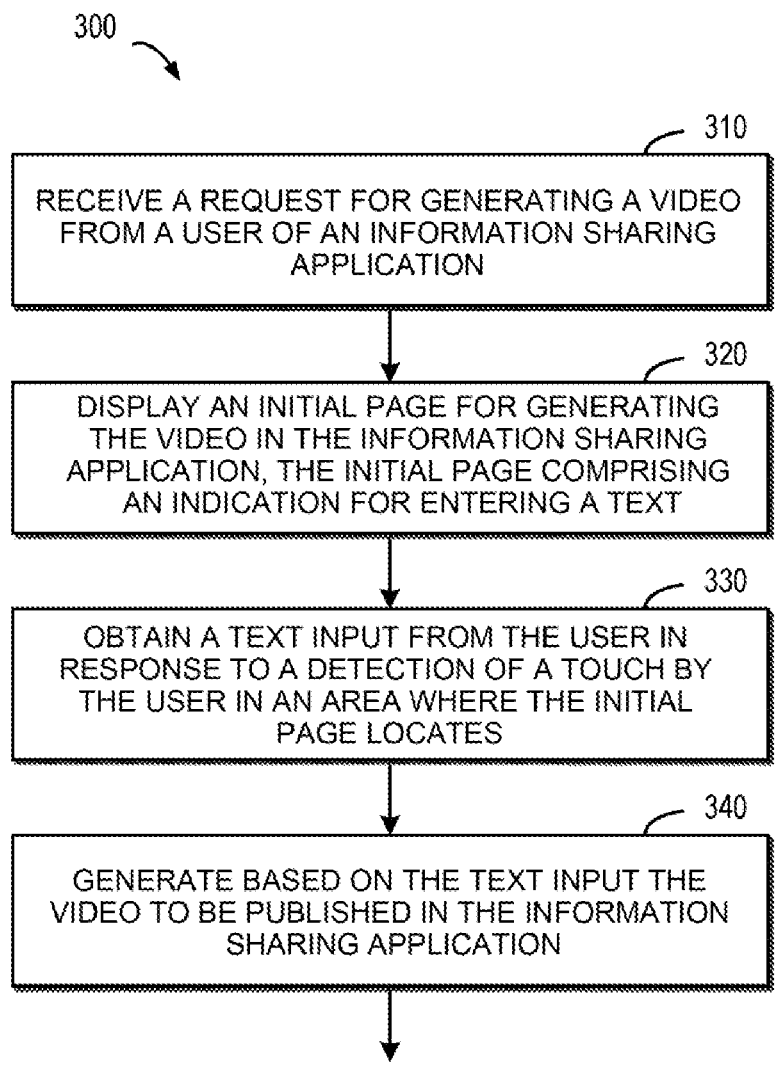
FIG. 3 schematically shows a flowchart of a method for generating a video in a text mode according to an example implementation of the present disclosure.

Hereinafter, more details of the example implementation according to the present disclosure will be described with reference to FIG. 3. FIG. 3 schematically shows a flowchart of a method 300 for generating a video in a text mode according to an example implementation of the present disclosure. At a block 310, a request for generating a video is received from a user of the information sharing application. According to an example implementation of the present disclosure, the user may slide the menu at the bottom of the user interface 200 as shown in FIG. 2, and then select the text mode 220 from a variety of video modes.

At a block 320 of FIG. 3, an initial page 210 for generating video is displayed in the information sharing application, where the initial page 210 comprises an indication for entering the text. According to an example implementation of the present disclosure, an input indication may be displayed at a prominent position in the initial page. The user may input the desired text according to the indication, for example, the user may activate the input dialog box by touching any blank area in the initial page 210 to input the text.

Figure 4:
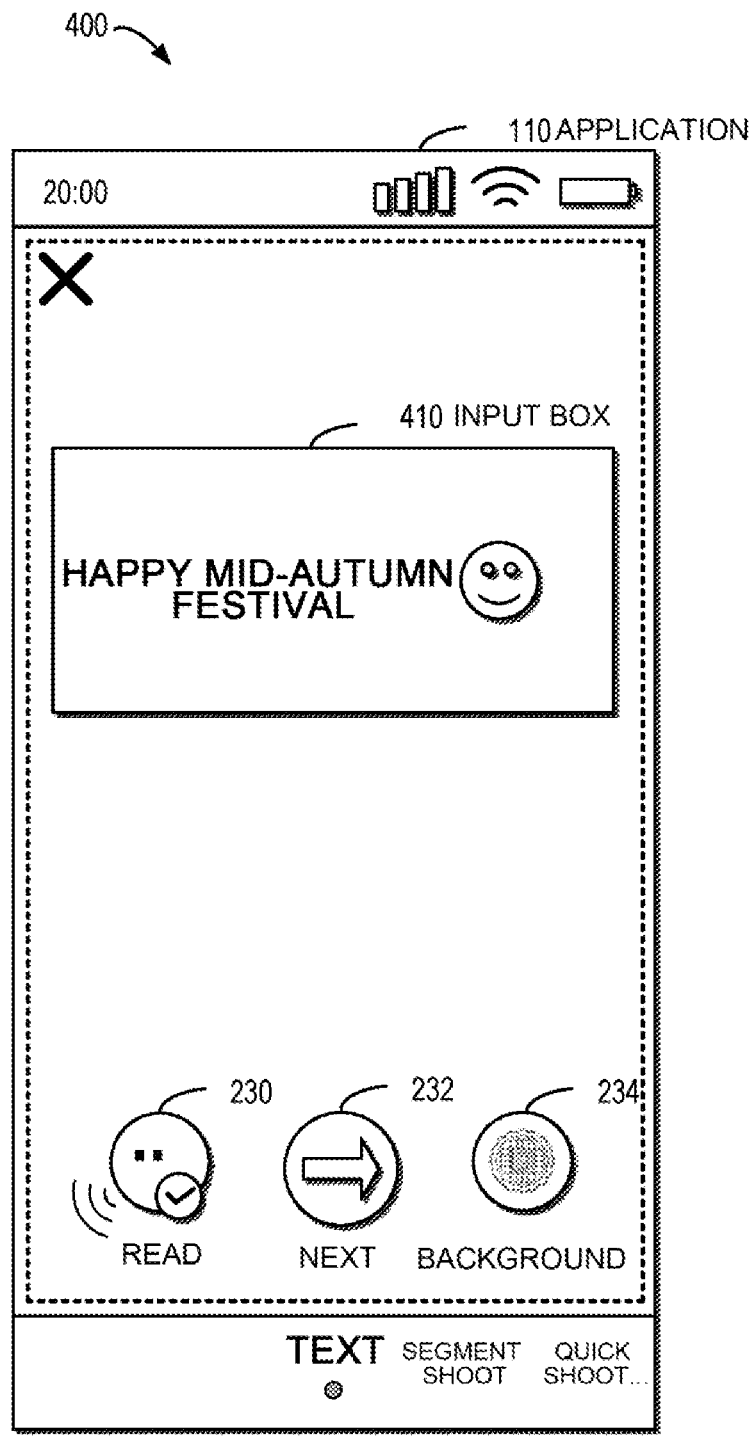
FIG. 4 schematically shows a block diagram of a user interface for inputting a text according to an example implementation of the present disclosure.

At a block 330, the text input from the user is obtained in response to a detection of a touch of the user in an area where the initial page 210 locates. The user may touch any blank area in the initial page 210 to input the text, and further details about the text input will be described below with reference to FIG. 4. FIG. 4 schematically shows a block diagram of a user interface 400 for inputting a text according to an example implementation of the present disclosure. As shown in FIG. 4, when the user touches the blank area of the initial page 210, an input box 410 may be popped up to receive the text input. For example, the user may enter the plain text content "Happy Mid-Autumn Festival."

According to an example implementation of the present disclosure, the text input may comprise a text and an emoticon. At this point, the user may also input the emoticon such as "a smiling face." It will be understood that the emoticon here may be an emoticon rendered by the operating system on the mobile terminal, and each emoticon may have a unique code. For a certain code, the rendered emoticon image may vary in different operating systems. For example, in "the smiling faces" rendered by two operating systems respectively, the corners of the mouth may be raised to different extents.

At a block 340, a video to be published in the information sharing application is generated based on the text input. When the text input has been obtained, a video comprising the text input may be generated for publishing. It will be understood that text input is the most basic element to generate the video. For other elements, a video with a default length may be generated based on a default video background. For example, the application 110 may select a moonlight background based on the content of the text and generate a video comprising the text "Happy Mid-Autumn Festival."

According to an example implementation of the present disclosure, the initial page 210 may comprise more options. Hereinafter, referring back to FIG. 2 to describe more details about the initial page 210. According to an example implementation of the present disclosure, the initial page 210 may further comprise an option 234 for selecting a video background. The user may click the option 234 to select a desired video background. For example, one or more of images, videos, emoticons and emoji animations may be selected as the background. The video may be generated based on the video background selected by the user. If the user selects an image of the moon cake, the background of the generated video will comprise the moon cake pattern.

Figure 5:
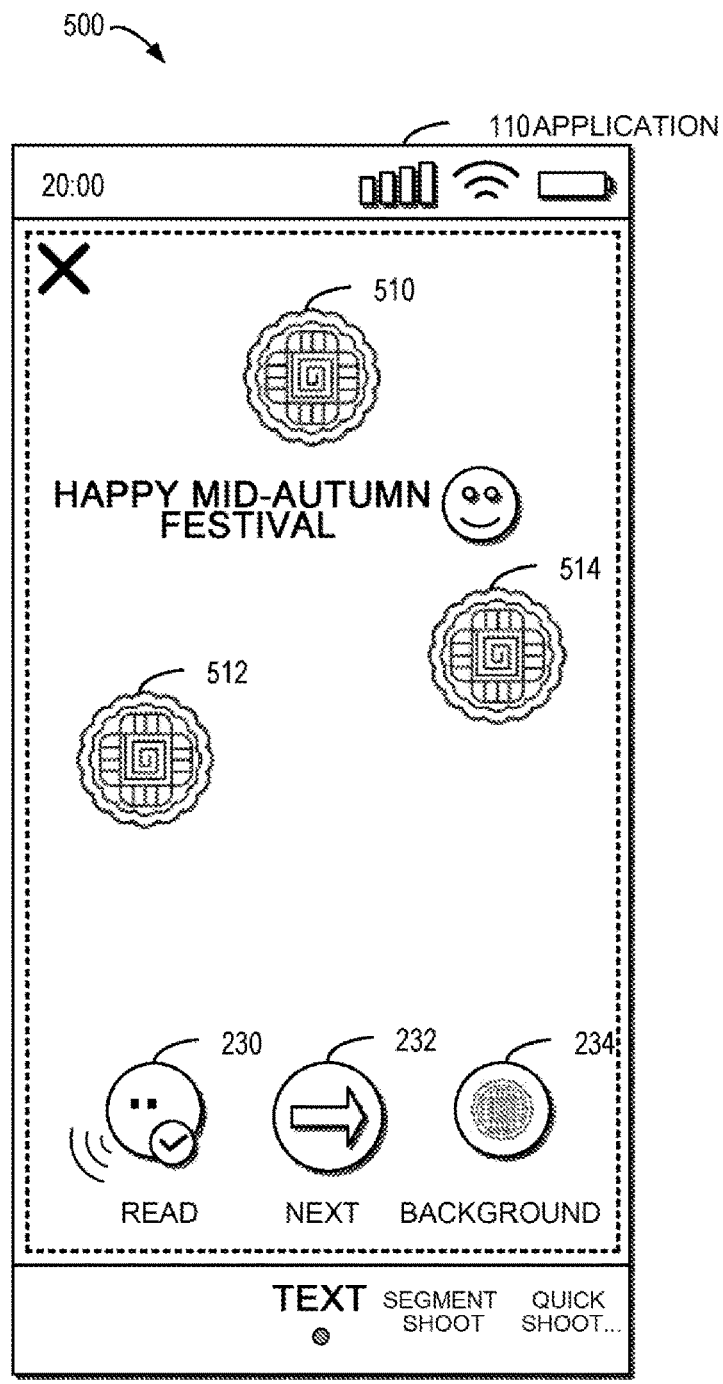
FIG. 5 schematically shows a block diagram of a user interface for selecting a video background according to an example implementation of the present disclosure.

According to an example implementation of the present disclosure, image positions, image numbers, image motion trajectories, and the like may be further specified in a dialog box for selecting the video background. More details about the video background are described with reference to FIG. 5, which schematically shows a block diagram of a user interface 500 for selecting a video background according to an example implementation of the present disclosure. The user may select the moon cake image as the background, and then may specify that the video comprise 3 images that are randomly distributed. At this time, the generated video will comprise images 510, 520, and 530. Further, the image may be specified to move in a certain direction. For example, a motion trajectory may be defined in advance, such as lines, curves, and the like. Alternatively and/or in additional to, the motion trajectory may be randomly generated. According to an example implementation of the present disclosure, additional rules may be defined: for example, it may be specified that a collision between images should be avoided when a plurality of images are displayed. In another example, it may be specified that the motion direction is changed when the image reaches the display boundary, and so on.

According to an example implementation of the present disclosure, a video may be selected as the background, and a segment within a certain time period of the video may be specified to be used (for example, a start time and an end time of a specified time period), an area in the video may be selected (for example, a portion within a certain window range may be specified to be used), and so on. According to an example implementation of the present disclosure, emoticons or emoji animations may be selected as the video background. By using the example implementation of the present disclosure, more abundant materials may be provided for the video generation, thereby meeting the various needs of the users.

Returning to FIG. 2, more details on the initial page 210 will be further described. According to an example implementation of the present disclosure, the initial page 210 may further comprise a reading option 230 for reading text input aloud. The user may start or cancel the automatic reading function by the clicking operation. When the user starts the automatic reading function, the application 110 may automatically create an audio when reading the text input by the user based on artificial intelligence technology, and generate the video based on the created audio. At this time, the generated video may comprise the audio that is read aloud. Alternatively and/or in additional to, the generated video may comprise both the text content and the audio content.

According to an example implementation of the present disclosure, the reading options may further comprise at least any of the following: the gender, the age, the voice style and the speech speed of the reader. In this way, the user may select readers with different genders and ages. According to an example implementation of the present disclosure, a variety of voice styles may be provided to meet the needs of different users. For example, the voice styles may comprise but not be limited to: vigorous, sweet, vivacious, and so on. The user may select different speech speeds of high, medium or low speed to support personalized configurations for reading effects.

According to an example implementation of the present disclosure, the user may cancel the reading option, and the generated video only comprises text content. According to an example implementation of the present disclosure, the user may be provided with a variety of materials for generating the video, so as to provide a richer media representation.

Figure 6:
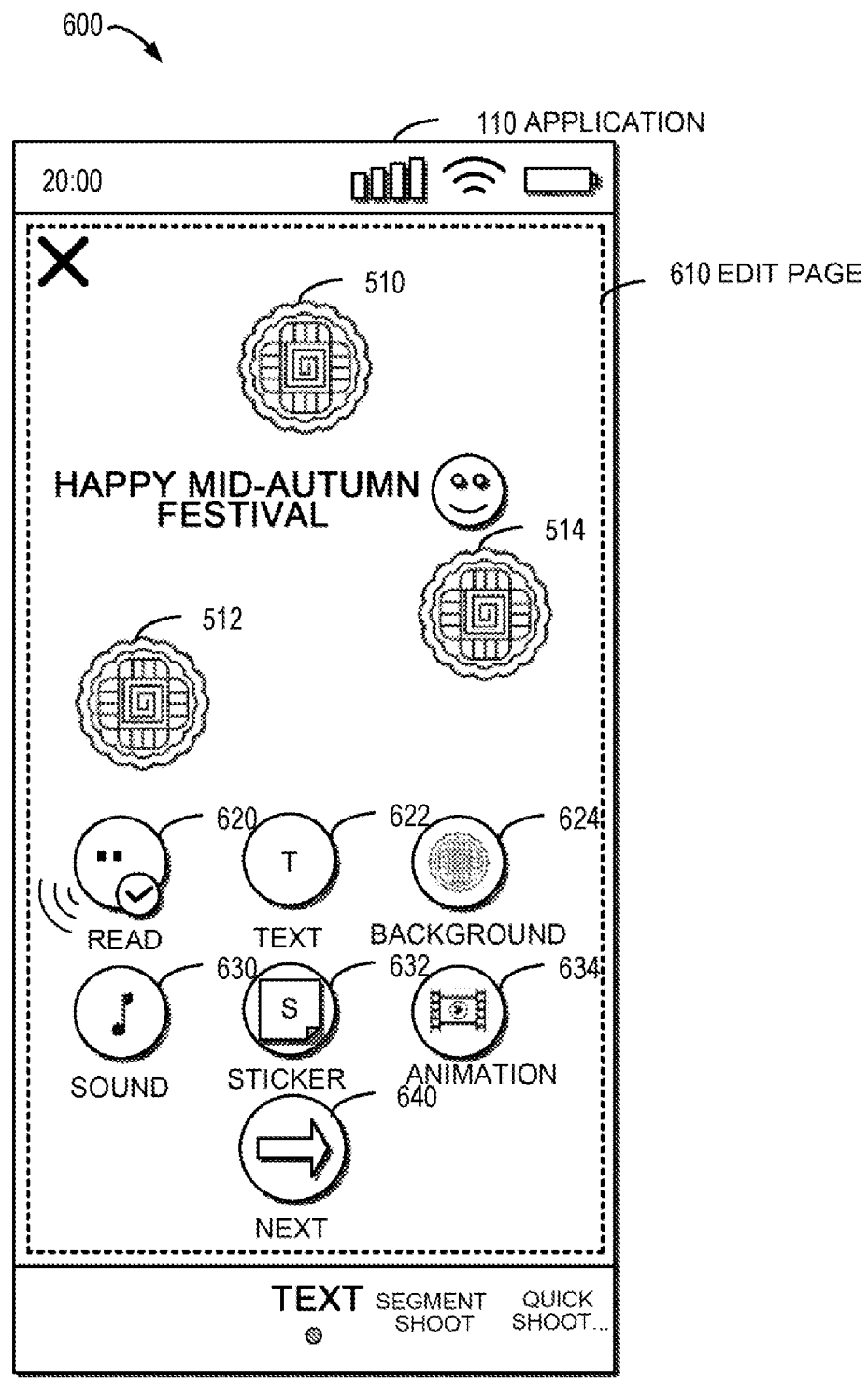
FIG. 6 schematically shows a block diagram of a user interface for editing a video according to an example implementation of the present disclosure.

The content of the initial page 210 has been described above with reference to the drawings. The user may make configurations in the initial page 210 to define various parameters for generating the video. After the user confirms the configurations in the initial page 210, he/she may click the "Next" button 232 to display the edit page. Hereinafter, more details about the edit page will be described with reference to FIG. 6, which schematically shows a block diagram of a user interface 600 for editing the video according to an example implementation of the present disclosure. The user may operate in the edit page 610, and the application 110 may generate a corresponding video based on the user operation by the user on the edit page 610.

According to an example implementation of the present disclosure, the edit page 610 may comprise at least any of the following: an option 620 for editing the reading configurations, an option 622 for editing the text input, and an option 624 for editing the video background. In the edit page 610, the user may enable or disable the automatic reading function via the option 620. The user may edit the input text via the option 622, and may set the font, size, color, display position, and the like of the text. The user may edit the selected background, reselect the background, add a new background, and the like via option 624.

After having edited the parameters to be adjusted, the user may press the "Next" button 640 to generate a corresponding video based on the edited options specified by the user in the edit page 610. With the example implementation of the present disclosure, the edit page 610 may provide the user with the function of modifying various parameters. In this way, when the user is not satisfied with the previous configurations, it provides an opportunity to modify, thereby facilitating the user's operation and generating a satisfactory video.

According to an example implementation of the present disclosure, the edit page 610 may further comprise an option 630 for selecting a background sound to be added to the video. The background sound here may comprise the background music and/or another audio such as the human narration. For example, the user may select background music or other sound for the video by pressing the option 630. Alternatively and/or in additional to, the user may record a narration, for example, the user may read aloud poems about the Mid-Autumn Festival, and so on.

After the user has selected the desired background sound, the application 110 may generate a corresponding video based on the background sound specified by the user's operation. By using the example implementation of the present disclosure, the user may be allowed to add more diverse sound files to the video, so as to generate richer video content.

According to an example implementation of the present disclosure, the edit page 610 may further comprise: an option 632 for selecting a sticker to be added to the video. The sticker here may comprise a text sticker and an image sticker. The text sticker may comprise the text, such as common expressions with various artistic fonts. The image stickers may comprise icons, common expressions, and image frames. The user may press the option 632 to insert a sticker into the video. For example, the user may insert a text sticker "Family Reunion" and an image sticker "Red Heart." Furthermore, the user may adjust the position, size and direction of the sticker by touching, dragging, rotating, zooming and other operations.

After the user has selected the desired sticker, the application 110 may generate a corresponding video based on the sticker specified by the user's operation. With the example implementation of the present disclosure, the user is allowed to add more personalized elements to the video. In this way, the video may be more interesting and provide richer media performance.

According to an example implementation of the present disclosure, the edit page 610 may further comprise options for specifying the length of the video. The video may have a default length of, for example, 3 seconds (or other numerical values). In order to provide better customized services, the user may customize the video length. Further, when the user selects the background sound (or video), the user may be allowed to further configure a matching relationship between the background sound (or video) and the video length. By default, sound (or video) clips that match the video length may be cut from the background sound (or video). If the length specified by the user is greater than the length of the background sound (or video), the user may set a loop playback. Alternatively and/or in additional to, the length of the generated video may be set based on the length of the background sound (or video).

After the user has selected the desired length, the corresponding video may be generated based on the length specified by the user operation. With the example implementation of the present disclosure, the user is allowed to adjust more parameters for the video generation, thereby facilitating the user to generate satisfactory video works.

According to an example implementation of the present disclosure, the edit page 610 may further comprise an option for specifying an animation mode for at least any of the text input and video background. The animation mode here may comprise multiple display modes for the text input and video background. For example, the animation mode used for the text input may specify that the text input is displayed in a gradient way or in a motion trajectory way.

According to an example implementation of the present disclosure, an animation mode for the video background may specify a way for displaying the background. When the video background is an image, the animation mode may specify the display area, the number, the display (the scaled display or tiled display) mode, the display trajectory, and so on. When the video background is a video, the animation mode may specify that a segment of the video within a certain time period is used as the background of the generated video, and it may specify a relationship between the video background and the resolution of the generated video, and so on. When the video background is an emoticon (or an emoji animation), it may specify the number of emoticons comprised in the generated video, the display position and the motion trajectory of the emoticons, and so on.

Figure 7:
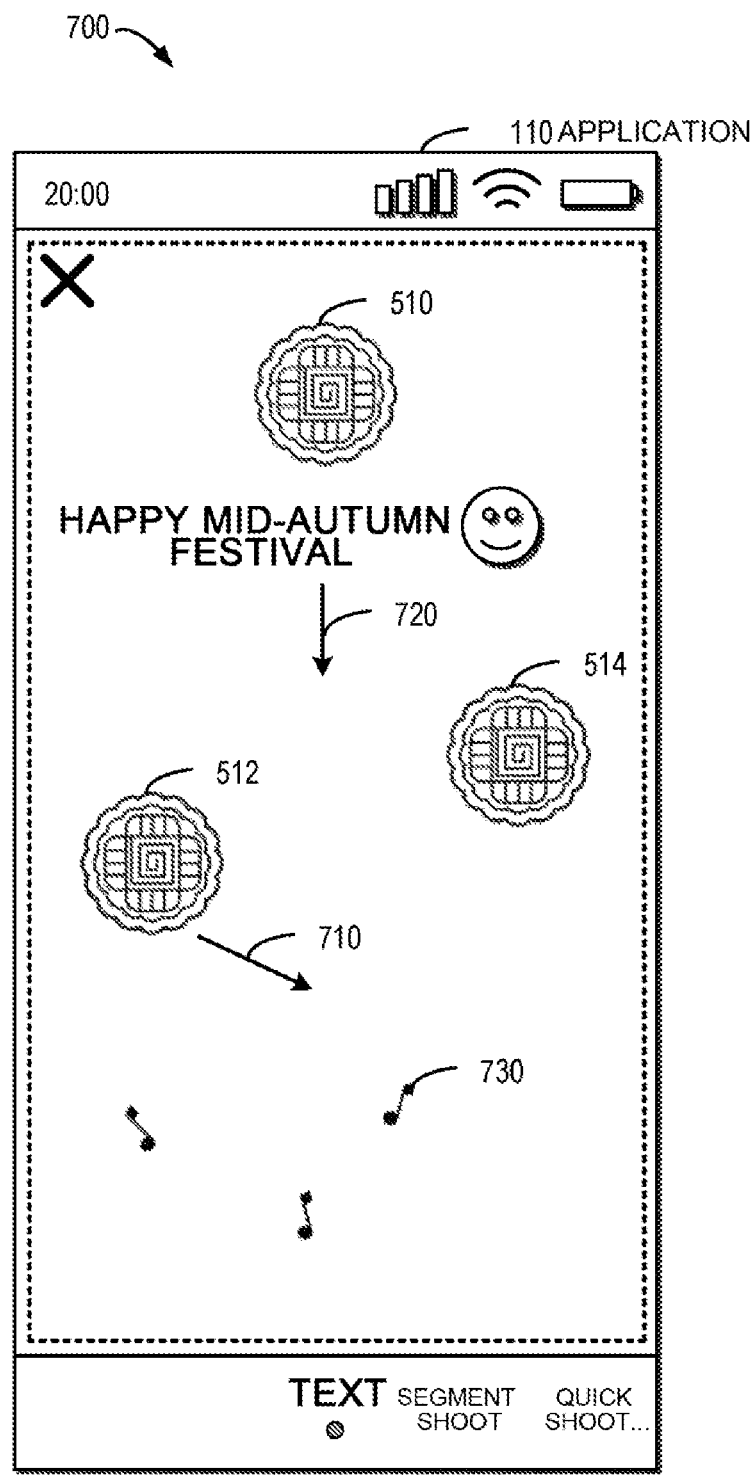
FIG. 7 schematically shows a block diagram of a user interface for previewing a video according to an example implementation of the present disclosure.

Further, the corresponding video may be generated based on the animation mode specified by the user operation. Suppose the user specifies that the text input is moved circularly from the top to the bottom of the screen, the background comprises three images, each of which moves in a randomly selected straight line direction, and changes the direction of movement when it reaches the boundary of the display area. At this time, the generated video will be as shown in FIG. 7. FIG. 7 schematically shows a block diagram of a user interface 700 for previewing video according to an example implementation of the present disclosure. In FIG. 7, the text input will move in the direction indicated by arrow 720, and then will reappear in the upper part of the display area after moving out of the lower part of the display area, so on and so forth. The three images 510, 512, and 514 may move in a randomly selected straight line direction. For example, the image 512 may move in the direction 710, and the direction of movement may be redetermined when the image 512 reaches the boundary of the display area.

According to an example implementation of the present disclosure, a predetermined default animation mode may be provided. At this time, the user does not have to select various parameters related to animation display individually, but may directly select a static background image to generate a dynamic video. In one example, a default animation mode for the background image may specify that three images are displayed, and the images jump in the video. At this time, when the user selects a moon cake pattern, the generated video will comprise a jumping effect including three moon cake patterns. Alternatively and/or in additional to, another default animation mode may specify that one image is displayed and the image rotates in the video. At this time, the generated video will comprise a rotation animation of the moon cake pattern. In another example, the default animation mode for text input may specify that the text input is displayed at the center of the video.

With the example implementation of the present disclosure, a dynamic video screen may be generated based on static text input. In this way, the user may be provided with richer visual representations to meet the needs of different users.

According to an example implementation of the present disclosure, if a request is received from a user for publishing the video, the video is published in the information sharing application. According to an example implementation of the present disclosure, when the user has completed the operation on the edit page 610, he/she may press the "Next" button 640 to generate the video. It will be understood that the video here may be a video file in various formats supported by the application 110. With the example implementation of the present disclosure, the video in the text mode may be generated and published in a single application. Compared with the prior art solution of switching between the video edit application and the information sharing application, the method described above may generate and distribute the video in a simpler and more effective way without a switch between applications.

According to an example implementation of the present disclosure, if the inputted text and/or the selected background image by the user comprise an emoticon that depends on the terminal device, the code of the emoticon may be stored in association with the video. It will be understood that there may be differences in rendering the emoticon when the terminal device adopts different operating systems. Suppose the user inputs the emoticon "smiley face," and the code of the emoticon is "001." At this time, the code "001" may be directly stored, instead of directly adding the emoticon rendered by the operating system of the user's terminal device to the video content. In this way, when another user plays the generated video, the corresponding "smiley face" may be displayed in the video based on the type of operating system of the other user's terminal device. The example implementation of the present disclosure may provide the user with more choices across a variety of operating systems.

Figure 8:
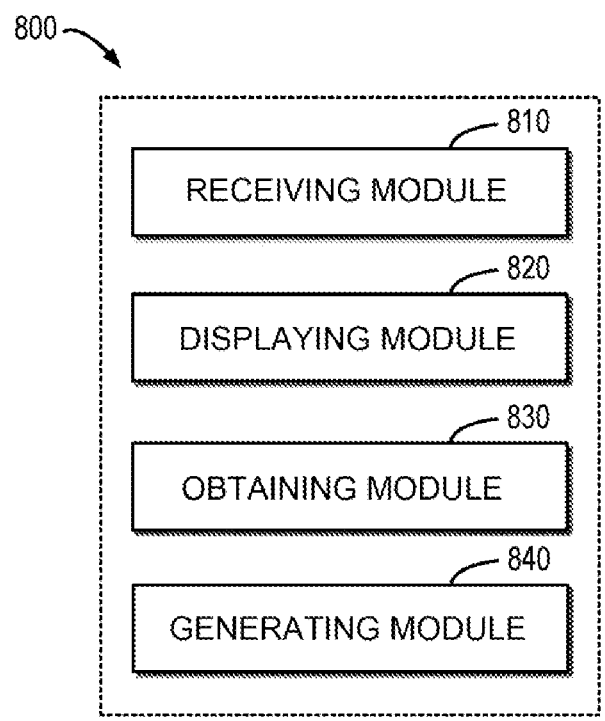
FIG. 8 schematically shows a block diagram of an apparatus for generating a video in a text mode according to an example implementation of the present disclosure.

The above paragraphs have described the details of the method 300 according to the example implementation of the present disclosure with reference to FIGS. 1 to 7. According to an example implementation of the present disclosure, there is further provided a corresponding device for implementing the above method or process. FIG. 8 schematically shows a block diagram of a device 800 for generating a video in a text mode according to an example implementation of the present disclosure. Specifically, the device 800 comprises: a receiving module 810, being configured for receiving a request for generating the video from a user of the information sharing application; a displaying module 820, being configured for displaying an initial page for generating the video in the information sharing application, the initial page comprising an indication for entering a text; an obtaining module 830, being configured for obtaining a text input from the user in response to a detection of a touch by the user in an area where the initial page locates; and a generating module 840, being configured for generating based on the text input the video to be published in the information sharing application.

According to an example implementation of the present disclosure, the initial page further comprises an option for selecting a video background; and the generating module 840 is further configured for generating the video based on a video background selected by the user in response to receiving the video background, the video background comprising at least any of an image, a video, an emoticon and an emoji animation.

According to an example implementation of the present disclosure, the initial page further comprises a reading option for reading the text input aloud; and the generating module 840 is further configured for generating the video based on an audio for reading the text input aloud in response to receiving a selection of the reading option by the user.

According to an example implementation of the present disclosure, the reading option comprises at least any of: a gender, an age, a voice style and a speech speed of a reader.

According to an example implementation of the present disclosure, the generating module 840 is further configured for generating the video based on the text input in response to receiving a cancel for the selection of the reading option by the user.

According to an example implementation of the present disclosure, the generating module 840 comprises: an edit page display module, being configured for, in response to a detection that the user confirms the initial page, displaying in the information sharing application an edit page for generating the video; and the generating module 840 further comprises: a video generating module, being configured for generating the video based on a user operation on the edit page by the user.

According to an example implementation of the present disclosure, the edit page comprises an option for editing at least any of: the text input, the video background, the reading option; and the video generating module is further configured for generating the video based on the edited option specified by the user operation.

According to an example implementation of the present disclosure, the edit page comprises: an option for selecting a background sound that is to be added into the video; and the video generating module is further configured for generating the video based on the background sound specified by the user operation.

According to an example implementation of the present disclosure, the edit page comprises: an option for selecting a sticker that is to be added into the video; and the video generating module is further configured for generating the video based on a sticker specified by the user operation, the sticker comprising a text sticker and an image sticker.

According to an example implementation of the present disclosure, the edit page comprises: an option for specifying a length of the video; and the video generating module is further configured for generating the video based on the length specified by the user operation.

According to an example implementation of the present disclosure, the edit page comprises: an option for specifying an animation mode of at least any of: the text input, the video background; and the video generating module is further configured for generating the video based on the animation mode specified by the user operation or a predetermined animation mode.

According to an example implementation of the present disclosure, the text input comprises an emoticon, and the generating module 840 comprises: an emoticon storing module, being configured for storing a code of the emoticon associated with the video for displaying the emoticon corresponding to the code according to a type of a terminal device used to play the video.

According to an example implementation of the present disclosure, the apparatus 800 further comprises: a publishing module, being configured for publishing the video in the information sharing application in response to a request for publishing the video from the user.

According to the example implementations of the present disclosure, the units comprised in the apparatus 800 may be implemented in various ways, comprising software, hardware, firmware, or any combination thereof. In some implementations, one or more of the units may be implemented using software and/or firmware, such as machine executable instructions stored on a storage medium. In addition to or alternatively to the machine executable instructions, some or all of the elements in the apparatus 800 may be implemented at least in part by one or more hardware logic components. As an example rather than a limitation, example types of hardware logic components that may be used comprise: field programmable gate array (FPGA), application specific integrated circuit (ASIC), application specific standard (ASSP), system on chip (SOC), complex programmable logic device (CPLD), and so on.

Figure 9:
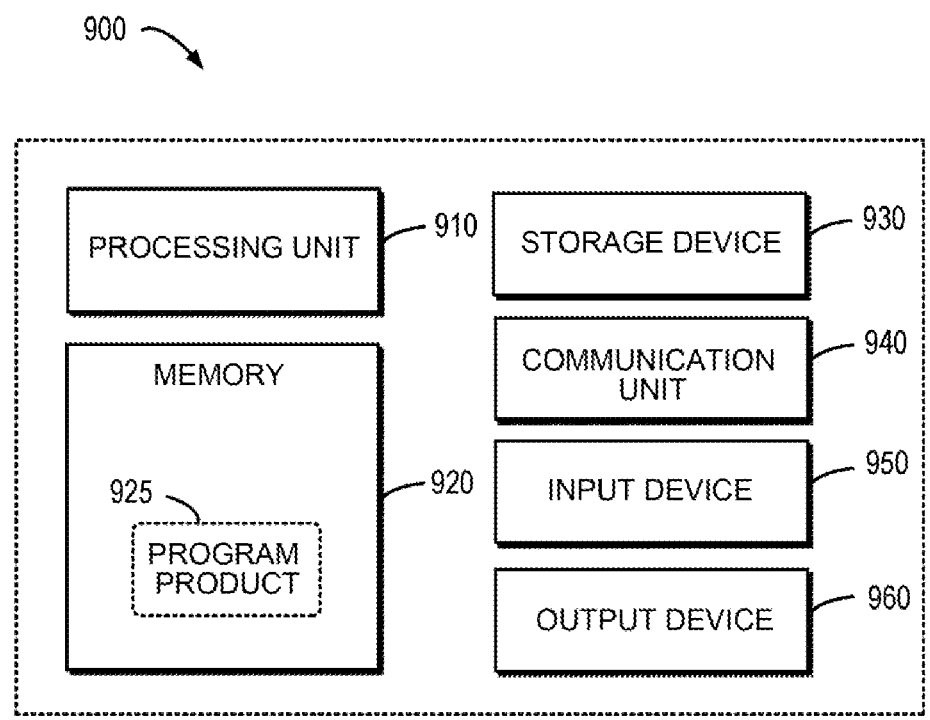
FIG. 9 illustrates a block diagram of a computing device capable of implementing a plurality of implementations of the present disclosure.

FIG. 9 shows a block diagram of a computing device/server 900 in which one or more implementations of the present disclosure may be implemented. It should be understood that the computing device/server 900 shown in FIG. 9 is only an example and should not constitute any limitation on the function and scope of the implementation described herein.

As shown in FIG. 9, the computing device/server 900 is in the form of a general-purpose computing device. The components of the computing device/server 900 may comprise, but are not limited to, one or more processing units 910, memory 920, storage devices 930, one or more communication units 940, one or more input devices 950 and one or more output devices 960. The processing unit 910 may be an actual or virtual processor and may perform various processes according to the programs stored in the memory 920. In a multiprocessor system, a plurality of processing units execute computer executable instructions in parallel to improve the parallel processing capability of the computing device/server 900.

The computing device/server 900 typically comprises a plurality of computer storage media. Such media may be any available media that are accessible to the computing device/server 900, comprising but not be limited to volatile and non-volatile media, removable and non-removable media. The memory 920 may be volatile memory (such as registers, cache, random access memory (RAM)), non-volatile memory (such as read-only memory (ROM), electrically erasable programmable read-only memory (EEPROM), flash memory), or some combinations thereof. The storage device 930 may be a removable or non-removable medium, and may comprise a machine-readable medium, such as a flash drive, a disk, or any other medium, which may be used to store information and/or data (such as training data for training) and may be accessed within the computing device/server 900.

The computing device/server 900 may further comprise additional removable/non-removable, volatile/non-volatile storage media. Although not shown in FIG. 9, a disk drive for reading or writing from a removable, non-volatile disk (e.g., a "floppy disk") and an optical disk drive for reading or writing from a removable, non-volatile optical disk may be provided. In these cases, each driver may be connected to a bus (not shown) by one or more data medium interfaces. The memory 920 may comprise a computer program product 925 having one or more program modules configured to perform various methods or actions of various implementations of the present disclosure.

The communication unit 940 realizes communication with other computing devices through a communication medium. Additionally, the functions of the components of the computing device/server 900 may be implemented in a single computing cluster or a plurality of computing machines that are capable of communicating through a communication connection. Thus, the computing device/server 900 may operate in a networked environment using logical connections with one or more other servers, network personal computers (PCs), or another network node.

The input device 950 may be one or more input devices, such as a mouse, a keyboard, a trackball, and the like. The output device 960 may be one or more output devices, such as a display, a speaker, a printer, and the like. The computing device/server 900 may also communicate with one or more external devices (not shown) through the communication unit 940 as needed, the external devices may be for example a storage device, a display device, and the like; and may communicate with one or more devices that enable the user to interact with the computing device/server 900 or may communicate with any device of one or more other computing device (such as a network card, a modem, and the like). Such communication may be performed via an input/output (I/O) interface (not shown).

According to an example implementation of the present disclosure, a computer-readable storage medium is provided on which one or more computer instructions are stored, wherein one or more computer instructions are executed by a processor to implement the method described above.

Various aspects of the present disclosure are described here with reference to flowcharts and/or block diagrams of method, apparatus (system) and computer program products according to implementations of the present disclosure. It should be understood that each block of the flowcharts and/or block diagrams and the combination of various blocks in the flowcharts and/or block diagrams can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flowchart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flowchart and/or block diagram.

The computer-readable program instructions can also be loaded into a computer, other programmable data processing apparatuses or other devices, so as to execute a series of operation steps on the computer, the other programmable data processing apparatuses or other devices to generate a computer-implemented procedure. Therefore, the instructions executed on the computer, other programmable data processing apparatuses or other devices implement functions/actions stipulated in one or more blocks of the flowchart and/or block diagram.

The flowcharts and block diagrams in the drawings illustrate system architecture, functions and operations that may be implemented by system, method and computer program products according to a plurality of implementations of the present disclosure. In this regard, each block in the flowchart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order depending on the functions involved. It should also be noted that each block in the block diagram and/or flowchart and combinations of the blocks in the block diagram and/or flowchart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the various implementations explained, are obvious for those skilled in the art. The selection of terms in the text aims to best explain principles and actual applications of each implementation and technical improvements made in the market by each implementation, or enable others of ordinary skill in the art to understand implementations of the present disclosure.

We claim:

1. A method for generating a video in a text mode in an information sharing application, comprising:
receiving a request for generating the video in the text mode from a user of the information sharing application, the text mode being used for generating a dynamic video screen based on a static text input;
displaying an initial page for generating the video in the information sharing application, the initial page comprising an indication for entering a text and a reading option for reading the text input aloud;
obtaining a text input in the information sharing application from the user in response to a detection of a touch by the user in an area where the initial page locates; and
in response to receiving a cancel for a selection of the reading option by the user, generating based on the text input in the information sharing application the video to be published in the information sharing application.

2. The method according to claim 1, wherein the initial page further comprises an option for selecting a video background; and
generating the video further comprises: generating the video based on a video background selected by the user in response to receiving the video background, the video background comprising at least any of an image, a video, an emoticon and an emoji animation.

3. The method according to claim 1, further comprising: generating the video based on an audio for reading the text input aloud in response to receiving the selection of the reading option by the user.

4. The method according to claim 3, wherein the reading option comprises at least any of: a gender, an age, a voice style and a speech speed of a reader.

5. The method according to claim 1, wherein generating the video comprises:
in response to a detection that the user confirms the initial page, displaying in the information sharing application an edit page for generating the video; and
generating the video based on a user operation on the edit page by the user.

6. The method according to claim 5, wherein the edit page comprises an option for editing at least any of: the text input, the video background, the reading option; and
generating the video based on the user operation comprises: generating the video based on the edited option specified by the user operation.

7. The method according to claim 5, wherein the edit page comprises: an option for selecting a background sound that is to be added into the video; and
generating the video based on the user operation comprises: generating the video based on the background sound specified by the user operation.

8. The method according to claim 5, wherein the edit page comprises: an option for selecting a sticker that is to be added into the video; and
generating the video based on the user operation comprises: generating the video based on a sticker specified by the user operation, the sticker comprising a text sticker and an image sticker.

9. The method according to claim 5, wherein the edit page comprises: an option for specifying a length of the video; and
generating the video based on the user operation comprises: generating the video based on the length specified by the user operation.

10. The method according to claim 5, wherein the edit page comprises: an option for specifying an animation mode of at least any of: the text input, the video background; and
generating the video based on the user operation comprises: generating the video based on the animation mode specified by the user operation or a predetermined animation mode.

11. The method according to claim 1, wherein the text input comprises an emoticon, and
generating the video comprises: storing a code of the emoticon associated with the video for displaying the emoticon corresponding to the code according to a type of a terminal device used to play the video.

12. The method according to claim 1, further comprising: publishing the video in the information sharing application in response to a request for publishing the video from the user.

13. An apparatus for generating a video in a text mode in an information sharing application, comprising:
a processor configured to:
receive a request for generating the video in the text mode from a user of the information sharing application, the text mode being used for generating a dynamic video screen based on a static text input;
display an initial page for generating the video in the information sharing application, the initial page comprising an indication for entering a text and a reading option for reading the text input aloud;
obtain a text input in the information sharing application from the user in response to a detection of a touch of the user in an area where the initial page locates; and
in response to receiving a cancel for a selection of the reading option by the user, generate based on the text input in the information sharing application the video to be published in the information sharing application.

14. An electronic device, comprising:
a memory and a processor;
wherein the memory is used to store one or more computer instructions, wherein the one or more computer instructions are executed by the processor to implement a method according to claim 1.

15. A non-transitory computer-readable storage medium storing one or more computer instructions thereon, wherein the one or more computer instructions are executed by the processor to implement a method according to claim 1.

* * * * *